Oct. 21, 1969 B. KAZAN 3,474,417

FIELD EFFECT SOLID STATE IMAGE PICKUP AND STORAGE DEVICE

Filed Sept. 29, 1966 2 Sheets-Sheet 1

INVENTOR.
BENJAMIN KAZAN

BY Ronald Zibelli

ATTORNEY

INVENTOR.
BENJAMIN KAZAN
BY
Ronald Zibelli
ATTORNEY

United States Patent Office 3,474,417

Patented Oct. 21, 1969

3,474,417

FIELD EFFECT SOLID STATE IMAGE PICKUP AND STORAGE DEVICE

Benjamin Kazan, Pasadena, Calif., assignor to Xerox Corporation, Rochester, N.Y., a corporation of New York Filed Sept. 29, 1966, Ser. No. 582,958

Int. Cl. G11b *13/00*

U.S. Cl. 340—173 24 Claims

In general, the present invention relates to pickup and storage devices; more specifically to a field-effect solid-state image pickup and storage device.

Devices currently available for the pickup and storage of an optical input or image and for their eventual conversion to electrical signals such as the vidicon and image orthicon suffer from inherent limitations. They are large in size and relatively fragile since they employ electron beam scanning and thus utilize delicate electronic elements mounted within an evacuated glass envelope. Further, where slow scan is required to generate output signals of low frequency, these tubes are particularly difficult to use because of the great reduction in signal current which depends upon the rate of neutralization of the charge pattern.

Accordingly, it is an object of this invention to provide a new, rugged, and highly efficient pickup and storage device and method which overcomes the deficiencies of the prior art as described above.

It is also an object of the present invention to provide a rugged solid-state pickup and storage device adapted to generate electrical output signals at arbitrarily slow scanning rates.

It is a further object of this invention to provide a pickup device with a relatively long storage capability which is erasable on demand.

Another object of this invention is to provide a pickup and storage device capable of generating large output signal voltages.

An additional object of this invention is to provide a new type of memory array and a new method of storing information for future readout.

Further, it is an object of this invention to provide a device in which the stored information or image may be repeatedly scanned without degrading the stored charge pattern.

Other objects and a fuller understanding of the invention may be had by referring to the following descriptions and claims taken in conjunction with the accompanying drawings.

Broadly, the present invention utilizes trapped surface charges to control the conductivity of a field effect semiconductor. Any suitable optical input and electrical output may be employed. The readout of these conductivity variations disclosed as the preferred embodiment in this case is by applying a voltage across selected conductors of an intersecting array. However, the invention may be utilized in a system such as shown in an alternative embodiment in the case where a stored image is read out by a metal probe mechanically and/or electrically scanning the elements. The invention may also be utilized in a system where readout is achieved by scanning the field effect layer with an electron beam to sense the conductivity variations from element to element in a layer as disclosed in copending application, Ser. No. 582,861, filed Sept. 29, 1966.

Thus, specifically, the present invention overcomes the deficiencies of the prior art and achieves its objectives by providing an array of conductors with photoconductively controlled field-effect charge storage elements at each intersection of the conductors. These corona charged elements undergo changes in conductivity in response to illumination. These changes in conductivity are read out as a time varying current or voltage when the supply voltage is sequentially applied at each intersection.

In order to facilitate understanding of this invention, further reference will now be made to the appended drawings of preferred embodiments of the present invention. The drawings should not be construed as limiting the invention but are exemplary only. In the drawings.

Figure 1:
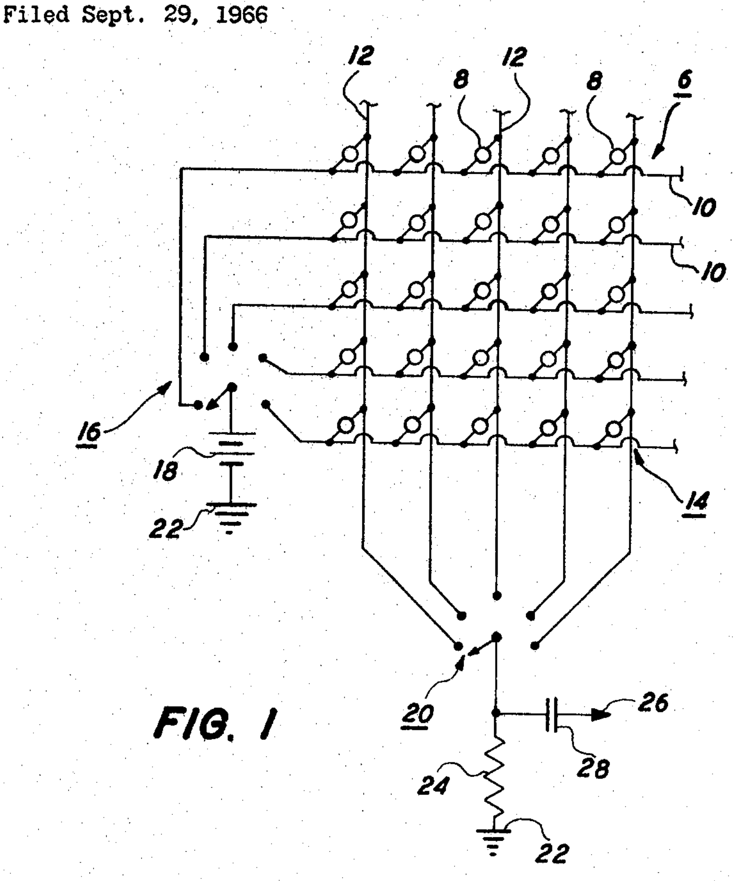
FIGURE 1 is a schematic representation of the conductive array of the present invention.

A preferred embodiment of the present invention is shown in FIGURE 1 in which an array of orthogonal X–Y conductors 6 has a charge control storage element 8 at each of the geometric (but not electrical) intersections of the X–Y conductors. The orthogonal array of X–Y conductors 6 is composed of vertically spaced horizontal conductors 10 and horizontally spaced vertical conductors 12. The vertical and horizontal conductors cross each other at a plurality of geometric intersections such as indicated at 14. The number of intersections is dependent upon the number of conductive paths. As indicated, the geometric intersections are electrically insulated so that the only electrically conductive paths between the horizontal and vertical conductors are through the charge controlled storage elements 8. A switch means indicated schematically at 16 and referred to as the vertical switch means, provides for the successive application of a supply voltage 18 to the individual horizontal conductors 10 of the vertical array. Another switch indicated schematically at 20 and referred to as the horizontal switch means, provides a path through the successive vertical conductors 12 of the horizontal array to ground 22 through load resistor 24. A time varying output voltage signal 26 is thus detectable by appropriate circuitry across capacitor 28 as the potential varies across load resistor 24. The size and spacing of the storage elements determine the ultimate resolution of the system and these parameters will be selected to correspond to the necessities of the desired use. The potential of the supply voltage varies in polarity and magnitude with the material selection, thickness, the response times required, and other parameters.

Figure 2:
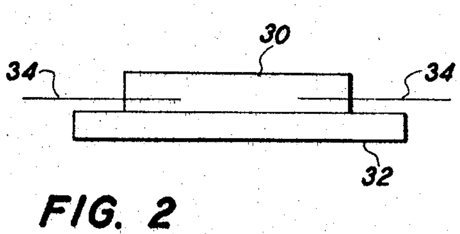
FIGURE 2 is a cross-sectional representation of the individual storage elements of the present invention.

The field-effect semiconductor storage elements are photoconductively responsive. The individual elements as shown in FIGURE 2 include a zinc oxide layer 30 on an insulating substrate 32 with two opposed electrodes 34 embedded in the zinc oxide layer 30.

While zinc oxide is referred to throughout as the preferred embodiment of the field-effect semiconductor material, any other suitable field-effect semiconducting material may be used. The characteristics of zinc oxide other than its field-effect properties have been described in general in an article entitled "A Review of Electrofax" by James A. Amick in the RCA Review, Dec. 19, 1959, vol. 20, No. 4, pages 753–769. For further information also see Xerography and Related Processes, edited by Dessauer and Clark, New York: 1965, Chapter 5. In addition to zinc oxide other typical field-effect semiconductors include cadmium sulfide, cadmium oxide, and lead oxide. However, zinc oxide is preferred because it is easy to deposit in thin film form, and is photoresponsive with good charge storing capability. Any convenient geometric arrangement of conductors and storage elements may be employed, and the invention herein disclosed is in no way limited to an X–Y array. For example, another convenient array is that shown in FIGURE 3 which is analogous to a polar coordinate system. The polar array 36 is composed of spaced concentric circles of conductors 38 which geometricaly (but non-electrically) intersect a plurality of radial conductors 40 at a plurality of intersections 42. The number of such intersections will depend upon the number of circular and radial conductors employed as determined by the resolution required or desired. Connected across the electrodes at each intersection is a field-effect semiconductor storage element 44 which is charge controlled and photoresponsive. The central switch means 46 provides for the successive application of a supply voltage 48 to individual radial conductors 40 of the array 36. Another switch means represented schematically at 50 provides successively for a completed current path through each of the concentric conductors 38 of array 36 to ground through a load resistor 54. A time varying output voltage signal 56 is thus detectable by appropriate circuitry such as capacitor 58 as the potential varies across load resistor 54.

The conductive array whatever its geometric shape can be formed in a variety of ways. It may be formed from individual wires laid out as desired or by etching a pattern in the insulating substrate and then silvering the pattern etched or by embedding an appropriately formed foraminous conductive layer in the field-effect semiconductor layer.

Figure 3:
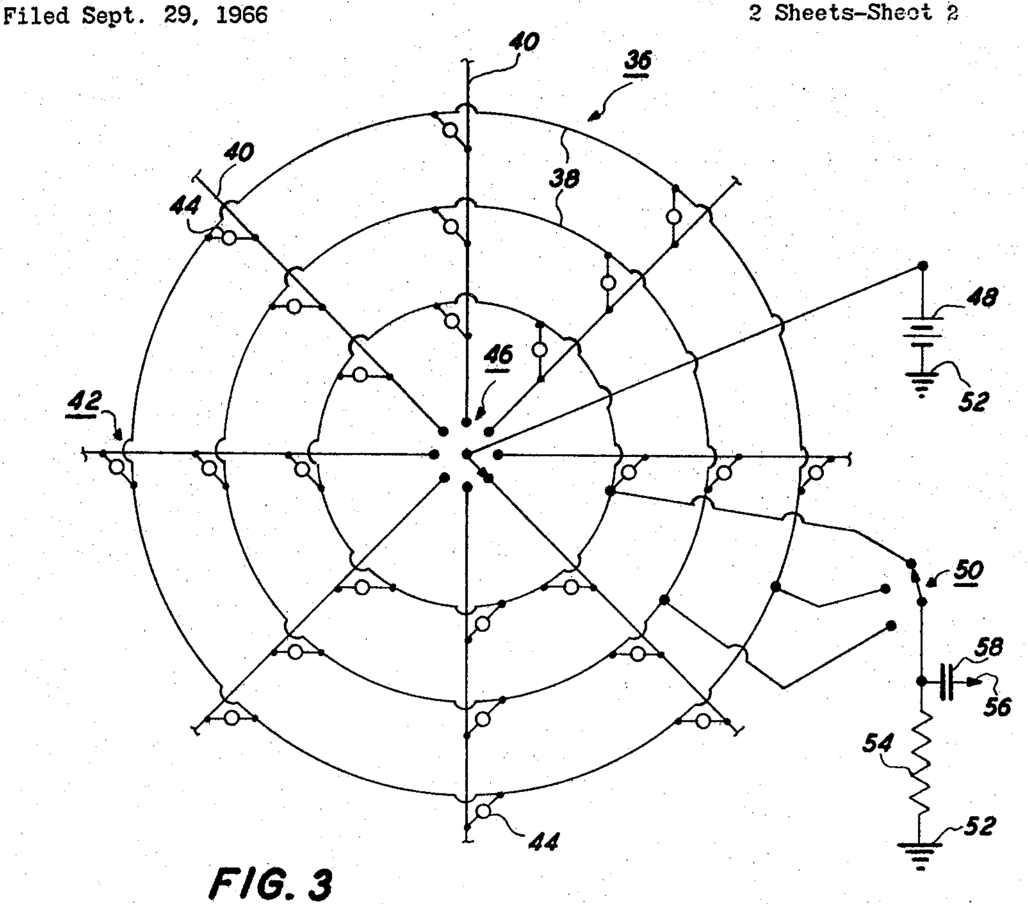
FIGURE 3 is a schematic representation of an alternative conductive array of the present invention.

Although as shown in FIGURES 1 and 3 an array of individual storage elements is used, this arrangement is indicated only for illustrative purposes. In practice a single continuous layer of field-effect semiconductor may be used with suitable electrode strips and gaps instead of the structure as shown.

Figure 4:
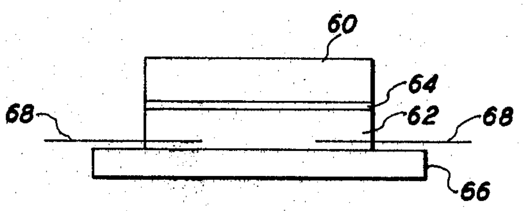
FIGURE 4 is a cross-sectional representation of an alternative form of the storage element.

An alternative embodiment of the individual storage elements for use where the field-effect semiconductor is not itself photoconductive or photoresponsive is shown in FIGURE 4. In this embodiment two separate layers are utilized in lieu of a single field-effect semiconducting photoconductive layer. In such an embodiment, any suitable material 60 exhibiting the properties of an insulating photoconductor such as selenium, forms a layer over the layer of field-effect semiconductor material 62, for example, cadmium sulfide or any other suitable semiconductor which need not also be photoconductive for use in this embodiment. Typical insulating photoconductors include arsenic trisulfide, amorphous selenium, arsenic-selenium alloys, anthracene metal-free phthalocyanine, zinc sulfide or any one of many other photoconductors dispersed in particulate form in an insulating binder. A thin insulating or blocking layer 64 on the order of about 1 micron in thickness may be provided between the photoconductive layer 60 and the field-effect semiconductor layer 62 to prevent direct injection of charge. As shown in FIGURE 4, the field-effect semiconductor layer is supported by an insulating substrate 66 and contains embedded within it two opposed electrodes 68.

Although as shown in FIGURES 1 and 3, the scan switching of the individual conductive paths is indicated as a mechanical switching process, this is for illustrative purposes only. The invention need not be limited to such mechanical switching means. The switching action may be accomplished by appropriate electrical switching circuits of the solid-state or vacuum tube type, e.g., by shift registors, electron beam, or by any other appropriate switching means.

In operation, corona charging means (not shown) are utilized to provide an initial uniform charge to all of the storage elements 8 shown in FIGURE 1. A suitable corona charging unit is disclosed in the patent to Carlson, No. 2,588,699. The application of a negative potential to the corona electrode generates a corona effect which floods the zinc oxide layer 30 of each storage element with negative ions. A uniform negative charge is established on the surface of the zinc oxide layer 30 of each storage element 8, thereby erasing any previous charge distribution. This charge shifts each storage element to a higher impedance state so that all intersections in the array have a high impedance. The zinc oxide layer of each storage element will remain in this state of high impedance so long as it is kept in a dark condition. Other known means are suitable for supplying a charge to the surface of the field-effect semiconductor layer and may be utilized. The conductivity layer of the field-effect layer may be increased by depositing positive charge on it in the same way that it is decreased by the deposition of negative charge and this technique may be used for reversing the sense or polarity of the image.

When a distributed pattern of light or other electromagnetic energy is directed to the storage elements 8 the charge pattern on the zinc oxide surface of the storage elements is altered due to the photoresponsiveness of the semiconductor layer and the conductivity of each storage element increases proportionately to the illumination received by each storage element. The conductivity of each of the storage elements remains at this altered level for a long period of time on the order of 1 hour, for example, or until each storage element is corona charged again. Thus, a conductivity pattern is established and stored in the array of zinc oxide storage elements.

The alterations in conductivity in the storage elements 8 described above result from the specific properties of a photocontrolled field-effect semiconductor, such as the zinc oxide employed in the preferred embodiment of the present invention. Negative ions formed from oxygen as a result of the corona will be deposited on the outer surface of the zinc oxide layer 30 and will tend to retain their negative charges rather than giving them up to the body of the semiconductive layer. This negative charge reduces the conductance of the zinc oxide layer 8 by repelling conduction electrons out of the layer and reducing the effective cross-section as in a conventional field effect device by a process analogous to the space charge effect in vacuum tubes. Insofar as the negative surface charges remain on the surface for a period of minutes or longer, the conductivity of the underlying zinc oxide remains correspondingly reduced for this period of time.

If during the time that the negative charges are trapped on the surface, illumination of appropriate wavelengths falls on the zinc oxide, hole-electron pairs are generated and some of these holes are attracted to the negative oxygen ions on the surface, thus, neutralizing them. The result is an increased conductance proportional to the number of negative charges neutralized at the surface of the zinc oxide. Thus, control of the conductivity in a photocontrolled field-effect semiconductor is achieved by the field effects or trapped surface charges.

Corresponding to the surface charge pattern the conductivity of the zinc oxide material below the surface will vary; that is, beneath the nagative charge areas the conductivity will be low, while beneath areas optically discharged, the conductivity will be high. The use of other suitable field-effect semiconductor materials allows for a reversal of applied polarity with corresponding alterations in charge transfer process.

It should be noted that both the manner of placing charge on the storage elements and the process which results in removal of the selected charges are immaterial to the field-effect control of the storage element. However, it should also be noted that the process by which charge is altered on the face of the zinc oxide layer in the preferred embodiment makes possible a continuous total integration of transient low energy level input image signals. Since the photoconductive effect results in neutralization of the relatively large uniform trapped surface charge, the signal representative of the exposure received by a storage element is a function of the integrated energy input over the entire time of exposure to the input signal.

The operation of the alternative embodiment of storage shown in FIGURE 4 proceeds upon similar principles to those described above. In the embodiment of FIGURE 4, a uniform surface charge is formed on the photoconductive layer 60. By the photoconductive action of a light pattern, a charge pattern is produced on the surface of the photoconductor. Corresponding to this charge pattern, local excess charges are induced in the underlying field-effect layer. The thin insulating or blocking layer 64 may be utilized to prevent direct injection of charge to the field-effect semiconductive layer 62 if the photoconductor is not sufficiently insulating. The altered charge distribution in the photoconductive layer, by its field, thus affects the charge distribution in the field-effect layer and the conductivity of the field-effect layer is altered thereby in a manner as described above with regard to the preferred embodiment of FIGURES 1 and 2.

Figure 5:
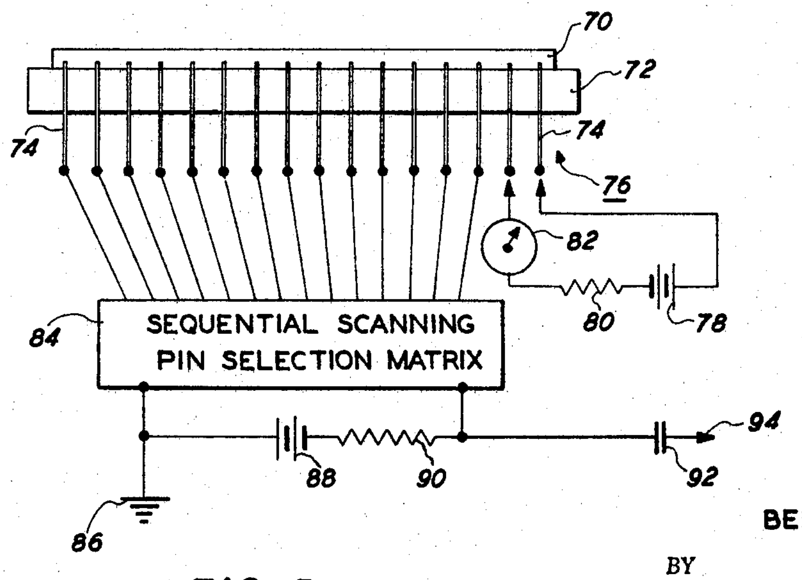
FIGURE 5 is a schematic representation of an alternative embodiment of the present invention.

An alternative readout system may employ the use of a multi-pointed probe for mechanical and/or electrical scanning. For example, one such alternative system is shown in FIGURE 5. In FIGURE 5 a continuous layer of field effect semiconductor 70, such as zinc oxide, is deposited on a glass plate 72, through which a multiplicity of conductive pins 74 pass having one end embedded in the field effect semiconductor layer 70. Charge is deposited on the semiconductor layer which may be of the single or double layer form as described above. Also as described above, exposure to a light pattern will result in point to point variations in conductivity in the field effect semiconductor layer 70. To detect these charges in conductivity a multiplicity of conductive pins 74 are provided in electrical contact with the field effect layer. Only one row of such pins 74 is shown in the cross section of FIGURE 5 but, of course, an entire X–Y array of such pins is employed to provide complete coverage of the field effect panel. The variations in conductivity may be detected through pins 74 by means of a dual pointed mechanical probe 76 which allows for the conductivity variations to be detected by its application to a power supply 78 to provide an electrical current for measurment through a suitable resistor 80 and ammeter 82. Such a probe may be moved manually, mechanically, or electrically to each pair of pins covering the face of the field effect semiconductor panel. Obvious variations of such a dual probe suggest themselves and are contemplated as a part of this invention. One such alternative form of readout involves connecting each of the pins 74 to a switching matrix consisting of known electrical-mechanical elements. Such a switching matrix designated sequential scanning pin selection matrix 84 in FIGURE 5 provides for one of each pair of pins to be momentarily connected to a ground 86 while the other pin of the pair is connected to a power supply 88 allowing for detection of the variations in conductivity across load resistor 90 by suitable output signal means such as indicated by capacitor 92. An output signal 94 represenative fo the point to point variations in conductivity is formed as matrix 84 sequentially switches to each pair of pins 74.

Thus, both the embodiments of FIGURE 2 and of FIGURE 4 provide for the establishment of a conductivity pattern in the array of storage elements. Since this conductivity pattern has a negligible decay, it can be read out by sequentially applying a given voltage from supply 18 to each intersection, thus producing a time varying output voltage 26. For example, a voltage 18 may be sequentially applied to each of the horizontal conductors 10. During the time voltage is applied to each horizontal conductor, connection may be successively made to each of the vertical conductors 12 through a grounded load resistor 24. In this manner, the supply voltage 18 is sequentially applied across invidivual storage elements 8 of the array 6 and the corresponding current allowed to flow through the load resistor 24. A time varying output voltage 26 can then be obtained across this resistor. Since, in practice, the impedance of the zinc oxide storage cells can be made relatively low, large signal voltages can be generated across the load resistor.

The variations in conductivity detected produce a modulated signal which may then be displayed by a suitable electronic image display system or may be used for other purposes.

After an image has been readout, the entire array of zinc oxide cells can be corona charged to erase any previous stored information and the array is then prepared for exposure to a new image.

It should be noted that the stored image may be scanned as many times as desired without disturbing the stored image, and further, that the array can be scanned at any arbitrary rate.

While the above description of the preferred embodiment of this invention has been directed particularly to describing its use as a solid-state field-effect semiconductor image pick-up and storage device, it will be obvious to those skilled in the art that the disclosed array may also be utilized as a new and improved memory array. This memory array has the capability of storing bits of information delivered to the individual storage elements either as an optical input or by altering the charge pattern on the individual element by an electrical probe and induction. Such a memory array will allow the addition of information and the correction of information already placed into the memory unit; it will, in addition, provide for an initial integration of the input within the memory array itself, if this is desired.

Whether utilized as an image pick-up device or as a memory array, the essence of the operation of the disclosed device remains the same. An array of intersecting conductors having photoconductively controlled field-effect semiconductor charge storage elements at each intersection is provided. The charge pattern on the storage element is altered in response to an electromagnetic input and thus, by field-effect the conductivity of the semiconductor of the storage element is correspondingly altered. The conductivity of each storage element is readout as a time varying voltage as the supply voltage is sequentially applied at each intersection.

In each of the embodiments described above either a single layer or a multi-layer array of the field-effect semiconductor may be employed.

Although a specific preferred embodiment of the invention has been described in the detailed description above, the description is not intended to limit the invention to the particular forms or embodiments disclosed herein since they are to be recognized as illustrative rather than restrictive. It will be obvious to those skilled in the art that the invention is not limited to the illustrative embodiments but is susceptible to numerous modifications and applications. The invention is declared to cover all the changes, modifications and applications of the specific examples of the invention herein disclosed for purposes of illustration which do not constitute departures from the spirit and scope of the invention.

What is claimed is:

1. An information storage device comprising:

(a) an array of electrical conductors comprising a plurality of individual conductors having a gap in electrical continuity between each conductor and every other conductor of the array, (b) a photoconductive field-effect semiconductor element in intimate contact with each of said individual conductors in said array at the gap in continuity between said conductor and another of said conductors, with each of said conductors being separated from another conductor by at least a portion of said semiconductor, said element having an exposed surface suitable for the deposition and retention of electrostatic charge thereon, (c) means to form a charge pattern on said exposed surface of said field-effect semiconductor element corresponding to an electromagnetic radiation input pattern, whereby the electrical conductivity of said semiconductor element is altered in correspondence to said charge pattern, (d) means to sequentially apply a voltage at each of said continuity gaps in said array which is filled by said field-effect semiconductor element, and (e) means to detect changes in the instantaneous conductivity of said field-effect semiconductor element at each of said gaps.

2. The device of claim 1 wherein said array of electrical conductors comprises an array of conductive pins having one end of each pin embedded in said semiconductor element.

3. The device of claim 1 wherein said array of electrical conductors comprises an array in which the individual conductors have a plurality of non-electrical intersections with each other.

4. The device of claim 3 wherein said gaps in continuity in said array are adjacent said intersections.

5. The device of claim 4 wherein said conductive array comprises an intersecting array of radial conductors and conductors in the form of concentric circles around the point of intersection of said radial conductors.

6. The device of claim 4 wherein said conductive array comprises a first array of conductors positioned in a first direction, and a second array of conductors positioned transverse to the direction of said first array and spaced therefrom.

7. The device of claim 6 wherein said semiconductor element is in the form of individual discrete storage elements at each of said gaps in continuity in said array.

8. The device of claim 7 wherein said semiconductor element is a single layer possessing photoconductive, field effect and charge storage properties.

9. The device of claim 8 wherein said single layer is zinc oxide.

10. The device of claim 7 wherein said semiconductor element includes an insulating photoconductor adjacent a field effect semiconductor.

11. The device of claim 10 wherein said insulating photoconductor is selenium and said field effect semiconductor is cadmium sulfide.

12. The device of claim 6 wherein said semiconductor element is a continuous layer covering said array.

13. The device of claim 12 wherein said semiconductor element is a single layer possessing photoconductive, field-effect and charge storage properties.

14. The device of claim 13 wherein said single layer is zinc oxide.

15. The device of claim 12 wherein said semiconductor element includes an insulating photoconductor adjacent a field effect semiconductor.

16. The device of claim 15 wherein said insulating photoconductor is selenium and said field effect semiconductor is cadmium sulfide.

17. The device of claim 2 wherein said semiconductor element comprises a single continuous layer of zinc oxide.

18. The device of claim 17 wherein said means to sequentially apply a voltage at each of said continuity gaps in said array comprises a mechanically scanned dual pointed probe.

19. The device of claim 17 wherein said means to sequentially apply a voltage at each of said continuity gaps in said array comprises a switching matrix.

20. A method of storing information comprising:

(a) charging the exposed surface of a field-effect semiconductor element, (b) selectively exposing the charged surface of said semiconductor element to an input pattern of electromagnetic radiation to convert said charges to a trapped surface charge pattern representative of said input, (c) storing said trapped surface charges representative of said input on said semiconductor element, (d) sequentially applying a voltage to a plurality of electrical conductors in contact with the field-effect semiconductor portion of said semiconductor element in a predetermined array to provide a signal indicative of the local resistivity of said semiconductor element, the resistivity being indicative of the relative magnitude of the electrostatic charge remaining on that portion of the exposed field-effect semiconductor element surface over the electrical path between said plurality of electrical conductors to which the voltage is being applied; and (e) detecting a signal representative of the local resistivity of said semiconductor element between said conductors in said array.

21. The method of claim 20 wherein said field-effect semiconductor element comprises a segment of a field-effect semiconductor material disposed between said plurality of electrical conductors in contact therewith, said field-effect semiconductor material being capable of retaining electrostatic charge on a surface thereof and conducting current through the body thereof without substantially altering the surface charge.

22. The method of claim 20 wherein said field-effect semiconductor element comprises a segment of field-effect semiconductor material disposed between said plurality of electrical conductors in contact therewith, an insulator material overlying one surface of said field-effect semiconductor material and a photoconductive insulating material overlying said insulating material.

23. The device of claim 1 wherein each photoconductive field-effect semiconductor element comprises a segment of a field-effect semiconductor material disposed between each of said individual conductors in contact therewith, said field-effect semiconductor material segment having an exposed surface suitable for the deposition and retention of electrostatic charge thereon, and capable of conducting current through the body thereof without substantially altering surface electrostatic charge; the exposed surface of said photoconductive field-effect semiconductor element comprising the exposed surface of said field-effect semiconductor material.

24. The device of claim 1 wherein said photoconductive field-effect semiconductor element comprises a segment of field-effect semiconductor material disposed between each of said individual conductors in contact therewith, a layer of insulating material overlying said field-effect semiconductor material, and a layer of photoconductive insulating material overlying said insulating material; the exposed surface of said field-effect semiconductor element comprising the exposed surface of said photoconductive insulating material.

References Cited

UNITED STATES PATENTS

| | | | |
|---|---|---|---|
| 2,887,632 | 5/1959 | Dalton | 317—238 |
| 2,940,941 | 6/1960 | Dalton | 317—238 X |
| 3,010,025 | 11/1961 | Bramley et al. | 250—213 |
| 3,165,634 | 1/1965 | Raymond | 250—219 |
| 3,191,040 | 6/1965 | Critchlow | 250—209 |
| 3,317,712 | 5/1967 | Silverman | 178—7.1 X |
| 3,348,074 | 10/1967 | Diemer. | |
| 3,372,317 | 3/1968 | Yamashita. | |

JAMES W. LAWRENCE, Primary Examiner
V. LAFRANCHI, Assistant Examiner

U.S. Cl. X.R.

250—209, 220; 315—169